March 23, 1926.
A. F. PARKER ET AL
1,578,089
DEMOUNTABLE WHEEL RIM
Filed Nov. 25, 1924
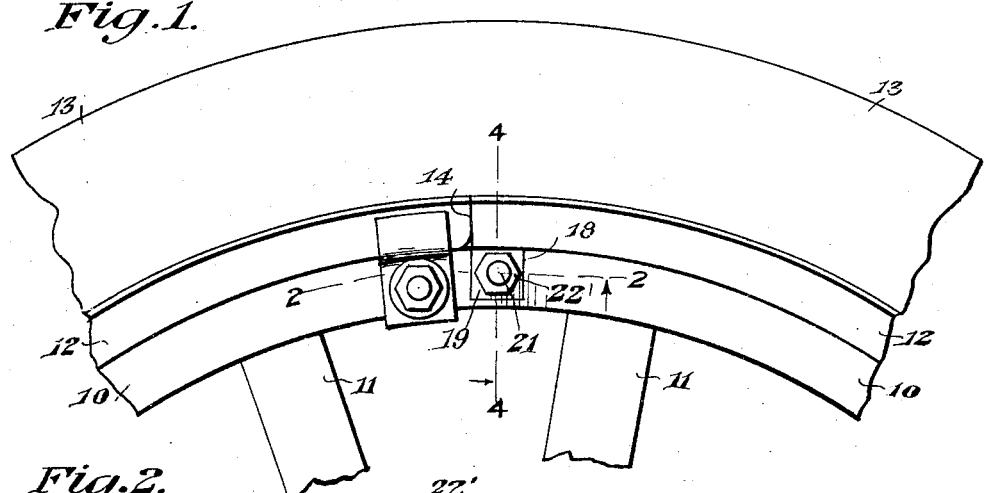
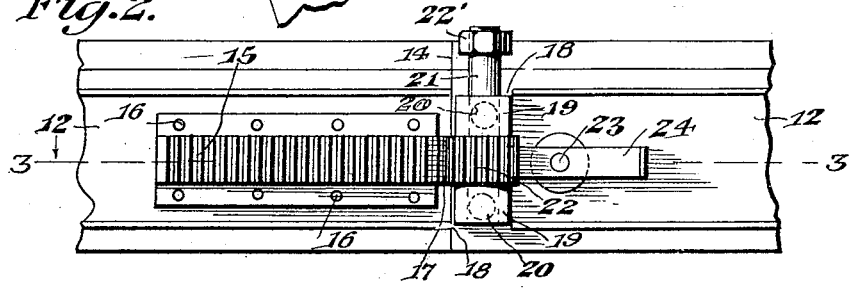
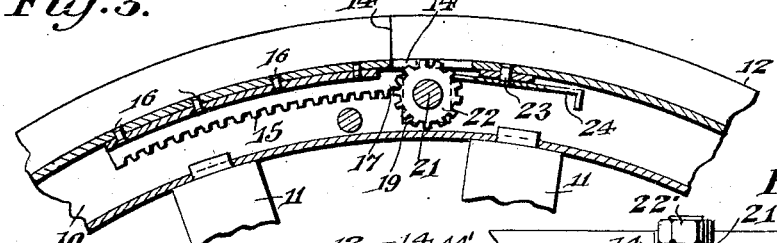
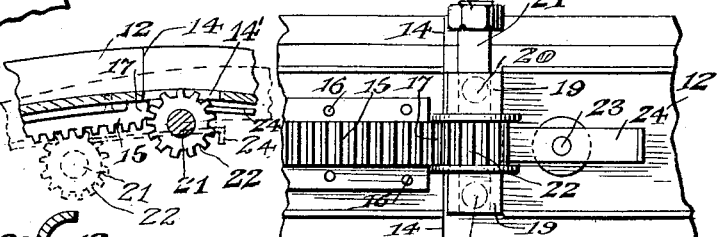
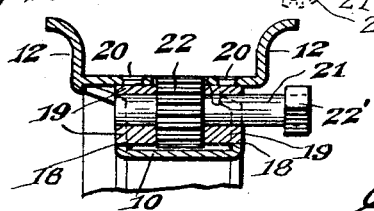
INVENTORS
*Arthur F. Parker*
*Edgar H. Hewitt*
BY *Samuel E. Watkins,*
*Geo. P. Kimmel.* ATTORNEY.

Patented Mar. 23, 1926.

1,578,089

UNITED STATES PATENT OFFICE.

ARTHUR FRANKLIN PARKER, EDGAR HARRY HEWITT, AND SAMUEL EDWARD WATKINS, OF PHILIPSBURG, PENNSYLVANIA.

DEMOUNTABLE WHEEL RIM.

Application filed November 25, 1924. Serial No. 752,187.

*To all whom it may concern:*

Be it known that we, ARTHUR FRANKLIN PARKER, EDGAR HARRY HEWITT, and SAMUEL EDWARD WATKINS, residing at Philipsburg, in the county of Center and State of Pennsylvania, have invented certain new and useful Improvements in Demountable Wheel Rims, of which the following is a specification.

This invention relates to demountable wheel rims, more particularly to the rims employed on wheels having pneumatic tires, and has for one of its objects to provide a device of this character having improved means for contracting the rim to facilitate the removal and application of the tire.

Another object of the invention is to provide a device of this character which may be adapted without material structural change to wheels of various sizes and to wheel rims of various configurations.

With these and other objects in view the invention consists in certain novel features of construction as hereinafter shown and described and then specifically pointed out in the claims, and in the drawings illustrative of the preferred embodiment of the invention—

Figure 1 is a side elevation of a portion of a conventional wheel with the improvement applied.

Figure 2 is a bottom plan view of a portion of a divided wheel rim with the improvement applied.

Figure 3 is a section on the line 3—3 of Figure 2.

Figure 4 is a transverse section on the line 4—4 of Figure 1, looking in the direction of the arrow.

Figure 5 is a view similar to a portion of Figure 2, illustrating a slight modification in the construction.

Figure 6 is a sectional detail illustrating the operation.

A part of the felloe is represented at 10, portions of a pair of the spokes at 11, a part of the rim at 12, and a section of the pneumatic tire at 13, these parts being of the usual construction.

The rim is of the usual divided form with its terminals abutting end to end as shown at 14, when in position on the felloe, and one of the abutting ends is recessed as at 14' for the purpose hereinafter set forth. As it is well known, rims of this type are adapted to be contracted and expanded to facilitate the removal from or the application of the tire thereto.

The present invention resides in improved means for thus contracting and expanding the divided rim, and comprises a rack bar 15 riveted or otherwise rigidly attached as shown at 16 to the inner face of the rim 12 at one side of the division 14, the terminal portion of the rack extending beyond the adjacent end of the rim and curved outwardly in short segmental form as shown at 17, the teeth of the body of the rack merging into the teeth of the shorter curved portion, as shown more clearly in Figure 6, the object to be hereafter explained.

The felloe 10, for illustration, is of the usual rolled steel channel shape transversely, and cut through the annular sides of the felloe are recesses or sockets indicated at 18 and attached to the inner face of the rim are spaced bearings 19, the latter riveted or otherwise rigidly attached, as shown at 20, to the rim and extending into the sockets. Rotatively supported in the bearings is a stub shaft 21, and attached to or formed integral with the shaft 21 is a gear pinion 22 adapted to engage the rack 15, and its segmental terminal 17, when the shaft is rotated, the shaft having a head 22' to receive a turning wrench, not shown. When the pinion 22 is turned, the teeth thereof will engage the teeth upon the portion 17 of the rack and run down and along the underside of the rack. The attached end of the rim will be drawn downwardly and beneath the adjacent rim end, causing the ends to overlap.

The bearings 19 of the shaft 21 are so located that when the terminals of the divided rim are arranged in abutting relation, as shown in Figures 1 and 2, the terminal tooth of the segmental or reversely curved portion 17 of the rack bar 15 will be engaged by the pinion, as shown more clearly in Figure 6, so that the presence of the pinion does not interfere with the abutting relation of the ends of the rim. Then when the rim is to be contracted to permit its removal from the tire, the first partial rotation of the shaft 21 will cause the pinion to engage the reversely curved portion 17 and "climb" upon the rack and pass thereover and draw the end of the rim to which the pinion is attached inwardly and thus decrease the diameter of the rim and enable the tire to be easily removed.

When the tire is to be restored to the rim after its puncture has been patched, or when an unimpaired tire is to be applied to the rim, the rim is left contracted until after the tire has been disposed thereon, and then the pinion rotated in the opposite direction to apply retrograde movement to the rack to forcibly expand the rim and when the pinion runs upon the short reversely curved portion 17, it will forcibly move the contracted end outwardly until the ends are again disposed in abutting position.

Pivoted at 23 to the rim 12 is a lock latch operative to engage the pinion 22, and hold the same in adjusted position and prevent the accidental or premature displacement or retrograde movement of the pinion.

The device is simple in construction, can be inexpensively manufactured and of any required size or strength to adapt it to the size of the wheel to which it is applied.

While the device is shown applied to a conventional channel shaped felloe it will be understood that the invention is not necessarily limited to this form of felloe.

The strength of the parts of the device may be varied to correspond to the size or form of the wheel.

The preferred embodiment of the invention is disclosed in the drawings and set forth in the specification, but it will be understood that modifications within the scope of the claimed invention may be made in the construction without departing from the principle of the invention or sacrificing any of its advantages.

Having thus described the invention what is claimed is:

In a device of the character set forth, a split demountable wheel rim having a recess formed in one of the abutting ends thereof, a gear rack secured to the central underside of said rim longitudinally thereof and having one end rounded and extending beyond the other abutting end gear teeth formed upon said rounded end, a pinion gear pivotally mounted beneath said recessed portion and normally engaging said teeth and acting when revolved to break said rim, said pinion passing along the underside of said rack causing the rim ends to overlap, and means connected with said pinion whereby the same may be caused to revolve.

In testimony whereof, we affix our signatures hereto.

ARTHUR F. PARKER.
EDGAR H. HEWITT.
SAMUEL E. WATKINS.